United States Patent

Chouinard et al.

[11] Patent Number: 6,028,414
[45] Date of Patent: Feb. 22, 2000

[54] FUEL CELL STAND-BY ENERGY SUPPLY SYSTEM

[75] Inventors: Jean-Guy Chouinard, Verdun; Raymond Roberge, Boucherville; Guy Ross, Beloeil, all of Canada

[73] Assignee: H Power Enterprises of Canada Inc., St. Laurent, Canada

[21] Appl. No.: 09/215,266

[22] Filed: Dec. 18, 1998

[51] Int. Cl.[7] .................................................. H02J 7/00
[52] U.S. Cl. ..................................... 320/110; 320/107
[58] Field of Search .............................. 320/110, 107, 320/106, 113; 429/99, 100; 307/46, 64, 66

[56] References Cited

U.S. PATENT DOCUMENTS

| | | |
|---|---|---|
| 4,937,513 | 6/1990 | Hoemann et al. ................. 318/772 |
| 5,290,641 | 3/1994 | Harashima ........................ 429/17 |
| 5,790,391 | 8/1998 | Stich et al. ...................... 307/64 |

*Primary Examiner*—Peter S. Wong
*Assistant Examiner*—Lawrence Luk
*Attorney, Agent, or Firm*—Swabey Ogilvy Renault; Guy J. Houle

[57] ABSTRACT

A fuel cell stand-by energy supply system is provided for supplying electrical power to a device operated by power from an electrical utility in the event of a power failure. The system is comprised of a microcontroller which is connected to a detector capable of detecting power failure. The microcontroller monitors this detector and one or more conditions of the device to which electrical power is fed. The microcontroller operates a fuel cell switch to connect the fuel cell d.c. supply directly to the d.c. device or to a voltage conditioning circuit to produce an operative a.c. supply which is connected to the device to continue operation thereof during the power failure. The microcontroller monitors and manages the load in relation to the fuel cell power. The microcontroller also performs an autodiagnostic of the fuel cell.

16 Claims, 4 Drawing Sheets

6,028,414

FUEL CELL STAND-BY ENERGY SUPPLY SYSTEM

TECHNICAL FIELD

The present invention relates to a fuel cell stand-by energy supply system for supplying electrical power to a device, for example a fossil fuel forced air furnace, in the event of a power failure.

BACKGROUND ART

Fuel cells are known as an alternate source of d.c. supply. The development of fuel cells has evolved greatly in the last decade and wherein these cells are now much more compact and less costly than heretofore. Fuel cells can now be powered by small cartridges in which hydrogen is stored under pressure. There are other means also available to power fuel cells.

In recent years we have also found an increase in power failures by the utilities, this being due to line overloading, inclement weather conditions or for many other reasons. We have also experienced power outages which have lasted many days and imposed hardships on thousands of households and which has led to some casualties. There is therefore a need to provide an electrical stand-by system which is capable of operating at least the electrical components of a fossil fueled furnace to maintain these households comfortable during periods of inclement weather and to also provide emergency lighting during power failures.

SUMMARY OF INVENTION

It is a feature of the present invention to provide a fuel cell stand-by energy supply system for supplying electrical power to one or more electrically operated devices in the event of a power failure and wherein the load of the device(s) is controlled and managed by a microcontroller in relation to the fuel cell power availability so as to maximize the use of the auxiliary power available by such fuel cells.

Another feature of the present invention is to provide a fuel cell stand-by energy supply system incorporating a microcontroller capable of minimizing the power consumption of a blower motor of a forced air furnace which is supplied by a fuel cell incorporated in a voltage conditioning circuit which produces an operative a.c. supply for the blower motor.

Another feature of the present invention is to provide a fuel cell stand-by energy supply system wherein a microcontroller monitors the power consumption of the fuel cell, provides an autodiagnostic thereof and further provides an indication of the energy remaining in the fuel cell and the energy consumed.

Another feature of the present invention is to provide a fuel cell stand-by energy supply system incorporating therein a auxiliary a.c. outlet whereby to provide a source for powering other electrically operated devices during power failures and wherein such a.c. outlet is controlled by a microcontroller.

Another feature of the present invention is to provide a fuel cell stand-by energy supply system incorporating storage battery(ies) for supplying electrical power, said battery (ies) being recharged by the fuel cell.

According to the above features, from a broad aspect, the present invention provides a fuel cell stand-by energy supply system for supplying electrical power to a device operated by power from an electrical utility in the event of a power failure. The stand-by energy supply system comprises detection means for detecting a power failure. Control circuit means is provided for monitoring the detection means and one or more conditions of the device. The control circuit means operates a fuel cell switch to connect a fuel cell or an integration fuel cell and battery d.c. supply directly or to a voltage conditioning circuit to produce an operative a.c. supply and for connecting the a.c. supply to the device to continue operation thereof during the power failure. The control circuit means also has power sensing means and means to control the operation of the device so as to maximize the use of the power available in the fuel cell.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
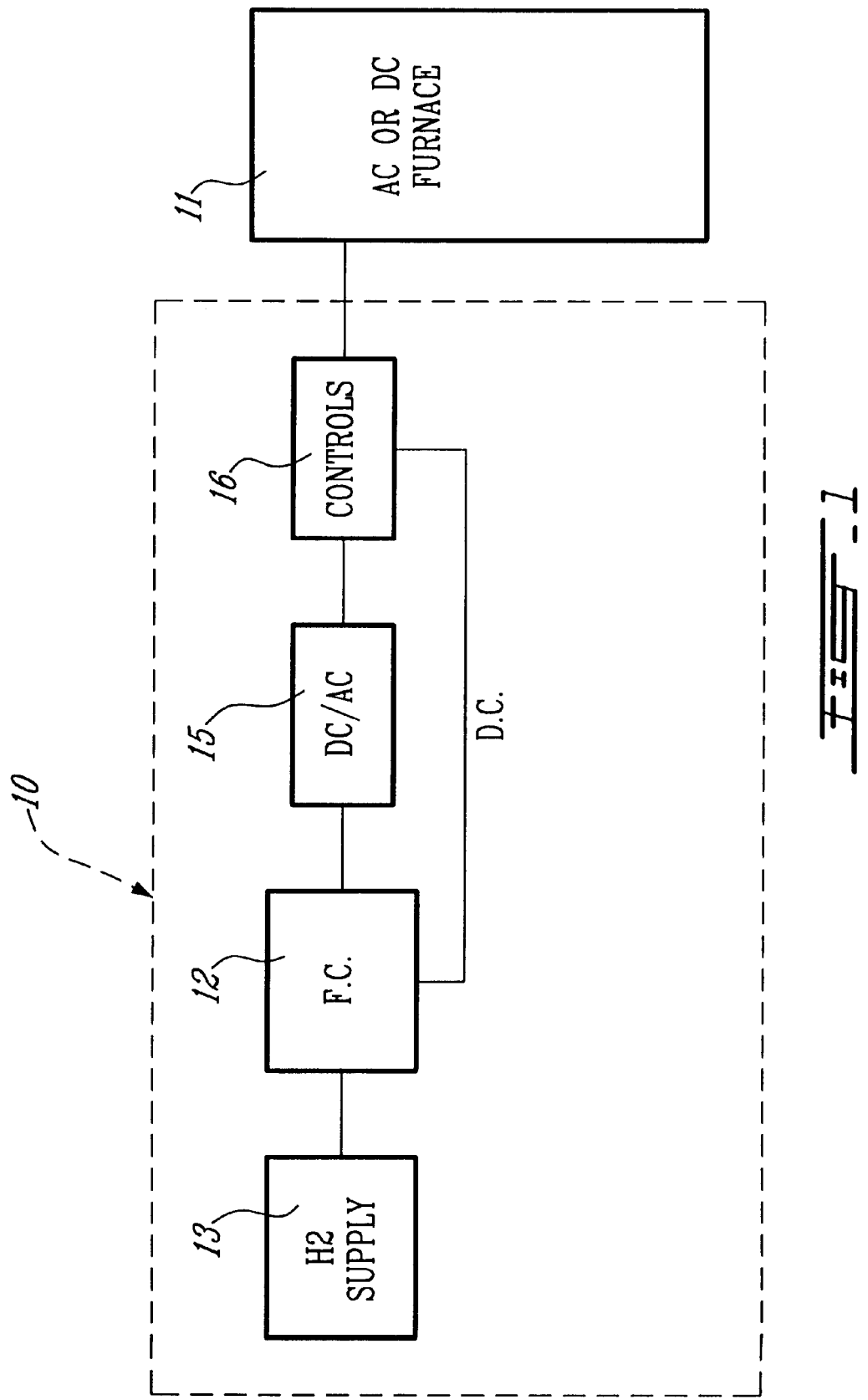
FIG. 1 is a block diagram showing an example of an application of the fuel cell stand-by energy supply system of the present invention.

Referring now to the drawings, and more particularly to FIG. 1, there is shown one application of the fuel cell stand-by energy supply system 10 of the present invention and herein for supplying power to an electrically operated fossil fueled forced air furnace 11 in the event of a power failure by the utility. Essentially, the fuel cell stand-by energy supply system 10 is comprised of a fuel cell 12 which is hydrogen operated and fed hydrogen from a storage, cartridge or any other hydrogen supply source 13. The fuel cell stand-by energy supply system 10 incorporates a d.c. to a.c. converter circuit herein referred to as a voltage conditioning circuit 15 whereby to convert the d.c. supply from the fuel cell to an a.c. supply. A microcontroller 16 controls the stand-by energy supply system and provides various features such as the control and management of the load in relation to the fuel cell power, herein the forced air furnace 11 or other devices which may be connected to the supply system, such as an auxiliary outlet 64 (see FIG. 2), so as to maximize the use of the power available from the fuel cell 12.

Figure 2:
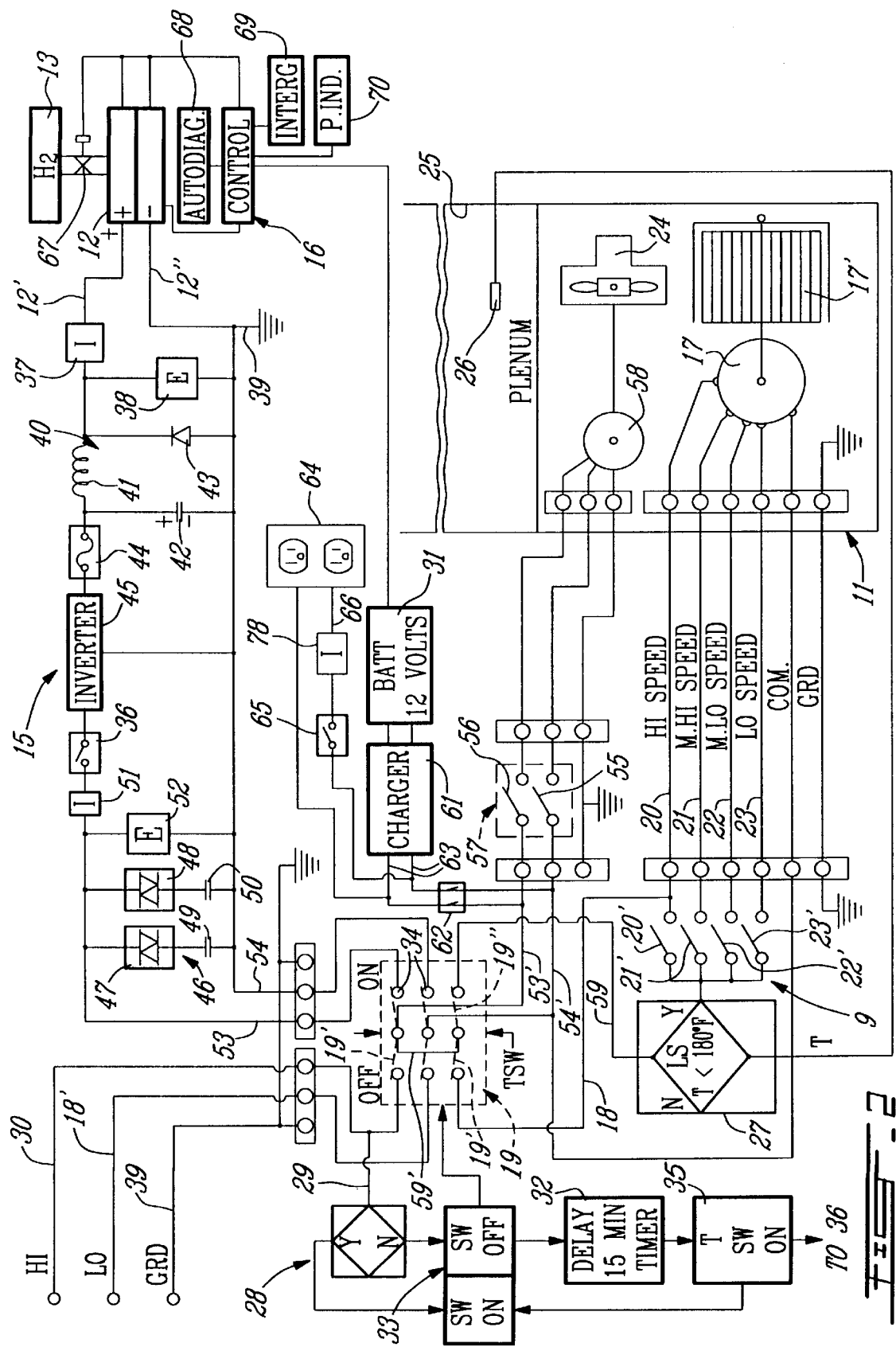
FIG. 2 is a detailed block diagram of the application of FIG. 1.
Figure 3:
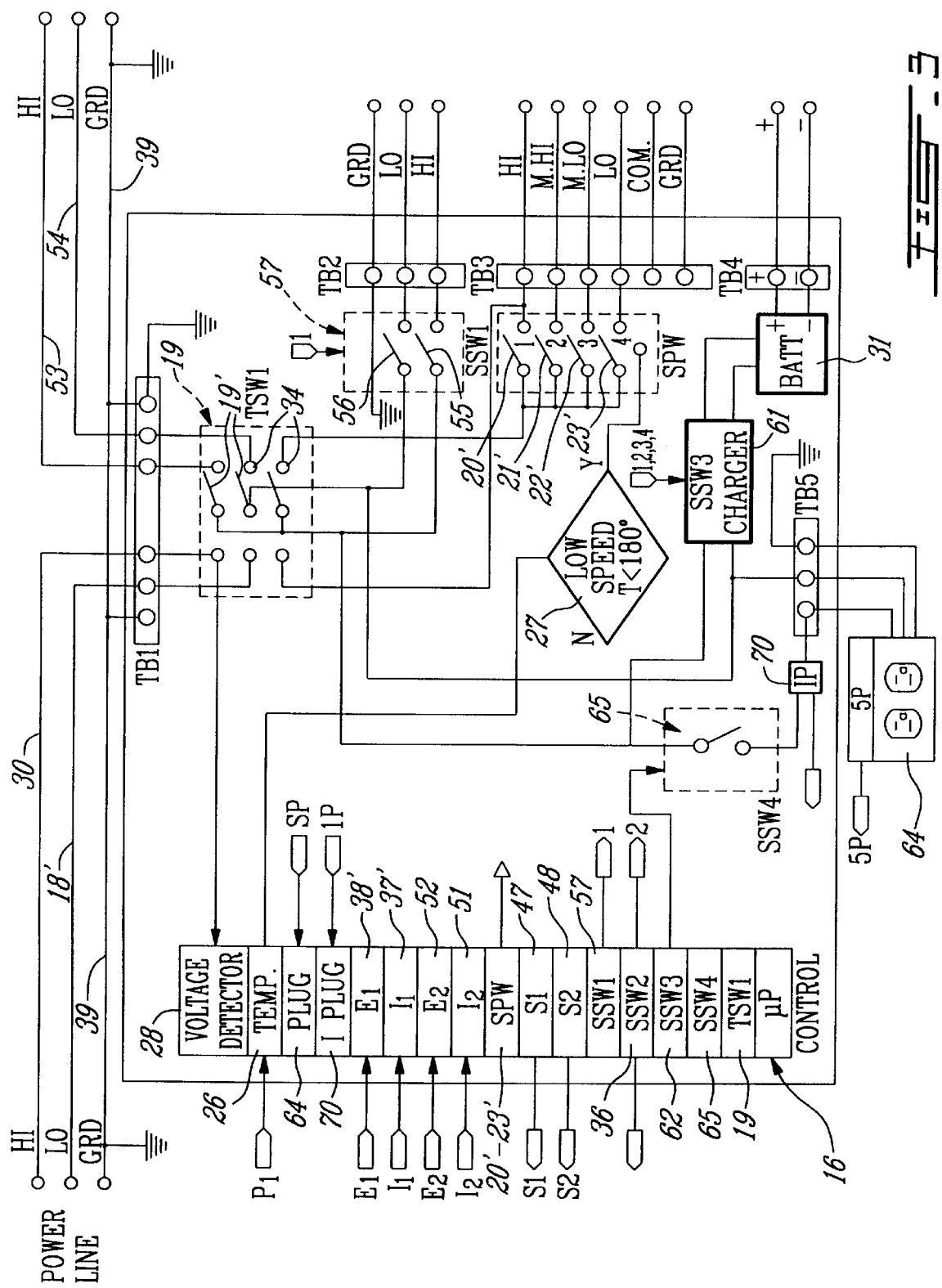
FIG. 3 is a further detailed block diagram but illustrating the features of the microcontroller and its interconnection with the various switches of the system to effectuate its control.
Figure 4:
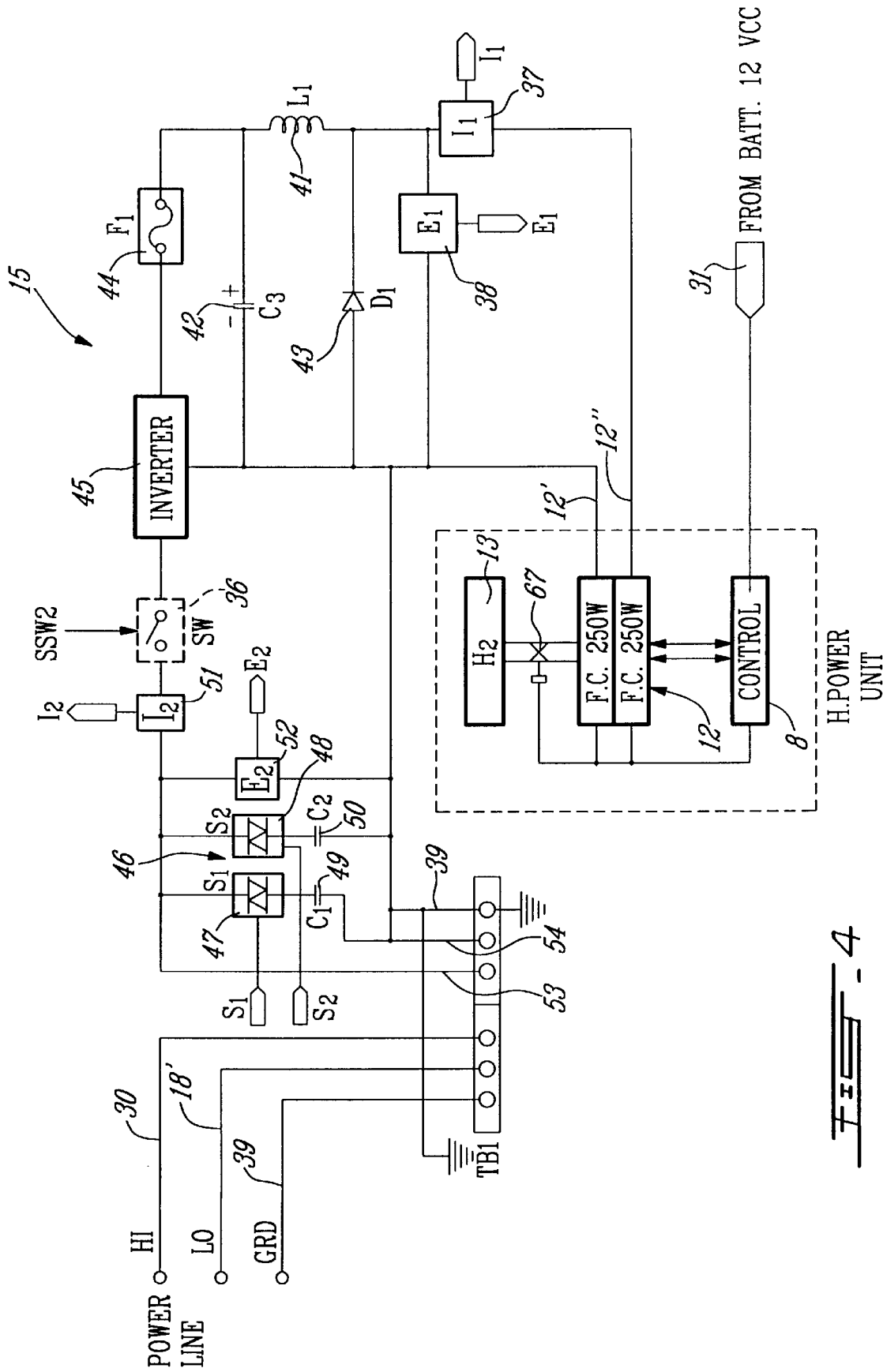
FIG. 4 is another view of the fuel cell d.c. energy supply and specifically the voltage conditioning circuit.

With reference now to FIGS. 2 to 4, there will be described the construction of the fuel cell stand-by energy supply system 10 of the present invention. As hereinshown, during normal operation of the forced air furnace 11, power is fed to its blower motor 17 through the power feed line 18 which is connected to the utility supply feed line 18' through a main switch 19 when the contact arms 19' are in their normally closed position as illustrated by reference numeral 19'. As hereinshown the blower motor 17 is a multispeed motor, the speed of which, and hence power consumption of which, may be controlled by operating the motor at different speeds through a switch 9 to which is connected four speed connection lines 20, 21, 22 and 23. In normal operation, TSW off, the high speed line 20 is connected and accordingly the motor rotates at its set speed to drive its fan 17' to force hot air generated by the heating element 24 into the plenum 25 of the furnace and into a ducting system, not shown.

As shown in FIG. 2, a temperature sensing probe 26 is located in the plenum 25 of the furnace and feeds a temperature signal to a temperature detector 27 which is controlled by the microcontroller 16 and which controls a plurality of switch contacts, namely switch contacts 20' to 23' of the switch 9 associated respectively with the speed control lines 20 to 23 of the blower motor 17. Accordingly, depending on which of the switches 20' to 23' is closed, the power consumption of the blower motor 17, will vary.

A power detector circuit 28 monitors the electrical power supplied by the utility and as hereinshown is connected through its connection 29 to one of the supply lines 30 of the utility supply and which is connected to the main switch 19. As soon as a power failure is detected the power detection circuit which is powered through the microcontroller 16 by an auxiliary battery supply 31, will place into operation a timer circuit 32 which will start counting a predetermined time, herein 15 minutes before placing into operation the fuel cell 12. This timer 32 is monitored by the microcontroller 16 and if power is not restored by the utility within that predetermined time limit, then the microcontroller 16 will send a signal to the switch actuating circuit 33 which will then displace the contact arms 19' of switch 19 to engage the contacts 34 of the main switch 19 which are associated with the output of the conditioning circuit 15. Also, at the output of the timer circuit 32 there is provided a further switch actuating circuit 35 which actuates the switch 36 which is provided in the voltage conditioning circuit 15 to connect the fuel cells 12 to the voltage conditioning circuit 15. Accordingly, the stand-by energy supply system is now operative.

As can be seen, the output connections 12' and 12" of the fuel cell 12 are connected across the voltage conditioning circuit 15 with connection 12' being connected to a current sensing probe 37 which senses the current flow into the voltage conditioning circuit 15. A further voltage probe 38 is connected across the output connections 12' and 12", with 12" being connected to reference ground 39. The current probe also provides a signal representative of the hydrogen consumption and both these probes feed a signal to the microcontroller 16, namely signals 37' and 38', as shown in FIG. 2. Accordingly, the microcontroller 16 can monitor the power consumption of the stand-by circuit and store in memory the energy consumed and from that calculate the energy remaining in the fuel cell and the remaining hydrogen supply in the cartridge 13.

The output of the fuel cell 12 is connected across a current stabilizing circuit 40 which consists of a coil impedance 41, a capacitor 42 and a diode 43 connected as hereinshown whereby to stabilize the output current when the load is switched on. This current stabilizing circuit is well known in the art. The voltage at the output of the current stabilizing circuit is fed to an inverter circuit 45, also very well known in the art, through a protective fuse 44. The inverter produces at its output an a.c. voltage of 120 volts and this voltage is further connected to a phase control circuit 46 which consists of two electronic static switches 47 and 48 connected in parallel across the output lines and each serially connected with a respective capacitor 49 and 50 and in parallel with one another. These switches maintain the current in phase with the voltage and this circuit and its operation is also well known in the art. A further current sensing probe 51 and voltage sensing probe 52 are connected at the output of the switch 36 in the same manner as the probes 37 and 38 and also feed measurement signals to the microcontroller, as shown in FIG. 3, to provide reference signals of the current and voltage at the output of the voltage conditioning circuit 15 and the consumption thereof.

As hereinshown the output connections 53 and 54 of the voltage conditioning circuit 15 are connected to a pair of terminals 34 of the main switch 19. With the contact arms now at their position 19", auxiliary power from the fuel cell is now connected to the switch arms 55 and 56 of the burner motor switch 57 which operate the fuel burner 58 and control circuit of the furnace 11.

As also shown, power is also fed to the temperature detecting circuit 17 through its connection line 59, the switch arm 19", and the connection line 59' of the main switch 19. This temperature detector circuit also has a switch control circuit which is operated by the microcontroller and capable of switching any one of the switches 20' to 23' depending on the desired operating speed of the blower fan 17'. As previously described, in order to minimize power consumption of the fuel cell, the blower may be operated at the low speed or mid low speed and accordingly switches 23' or 22' will be closed as determined by the microcontroller. This will permit the blower motor 17 and blower fan 17' to operate for a much longer period of time thereby convecting the hot air into the plenum chamber 25 and through the ducting system in the building structure to heat the building.

The burner motor switch 57, in combination with the furnace control, is operated by a thermostat 60 which senses the temperature of the ambient air in the building. When the temperature of the air falls below a preset value, it will cause the burner to operate and at the same time the temperature sensing probe 26 will signal to the temperature detector and the microcontroller that it is necessary to place the burner in on or off operation.

As shown in FIG. 2, a battery charger 61 is also connected to the switch inlet lines 53' and 54' to maintain the auxiliary battery supply 31 fully charged. A switch 62 is connected across the input lines 63 of the charger and controlled by the microcontroller, as shown in FIG. 3. Across the feed lines 53' and 54' is also connected an auxiliary a.c. outlet plug 64 to provide power to other electrically operated devices, such as lamps, refrigerators, etc. during the power failure period. A current sensing probe 78 is connected to the line 66 of the a.c. outlet plug 64 and provides a signal to the microcontroller of the consumption of the auxiliary loads connected to the a.c. outlet plug 64 A switch 65 is connected to the input line 66 of the auxiliary a.c. outlet and controlled by the microcontroller. If the burner motor 58 is operative, then the microcontroller will actuate switch 65 to place it in an OFF condition whereby to manage the power supplied by the fuel cells. It is pointed out that these fuel cells consist of power units thus providing maximum supply but the blower itself may be a 1000 watt load. Accordingly, the operation thereof will be achieved by proper management of its power consumption and this is done through the microcontroller and the motor speed control switch 9.

The fuel cells also have an integrated control 8, see FIG. 4, and these cells are fed by the hydrogen supply 13 through a regulating valve 67 which is controlled by its control 8. As shown in FIG. 2, the microcontroller also has an autodiagnostic program function to monitor the operation of the fuel cell 12 and its supply 13 as well as the entire operation of the system and this is represented in block form by reference numeral 68. A program integrator circuit 69 does the calculation of the power consumption and power remaining in the fuel cell. A visual indicator 70 is fed by the microcontroller to provide a display of the condition of the fuel cell as well as signals indicating if a further hydrogen supply cartridge 13 is required or the time remaining in the one presently being used.

Although the particular embodiment as shown in FIGS. 2 to 4 describes the fuel cell stand-by supply system 10 of the present invention in association with a forced air furnace, such a system may be adapted to all sorts of electrically operated devices such as hot water heaters, lighting systems, alarm systems, and a multitude of other devices. Also, although the fuel cells as hereinshown are supplied by hydrogen cartridges 13, it is conceivable that the hydrogen may be supplied by a supply line fed by a hydrogen producing system or by other supplies or directly by hydrocarbon, methane or methanol.

It is within the ambit of the present invention to cover any obvious modifications of the preferred embodiment described herein, provided such modifications fall within the scope of the appended claims.

We claim:

1. A fuel cell stand-by energy supply system for supplying electrical power to a device operated by power from an electrical utility in the event of a power failure, said stand-by energy supply system comprising detection means for detecting a power failure, control circuit means for monitoring said detection means and one or more conditions of said device, said control circuit means operating a fuel cell switch to connect a fuel cell or an integration fuel cell and battery d.c. supply directly or to a voltage conditioning circuit to produce an operative a.c. supply and for connecting said a.c. supply to said device to continue operation thereof during said power failure, said control circuit means having power sensing means and means to control the operation of said device so as to maximize the use of the power available in said fuel cell.

2. A fuel cell stand-by energy supply system as claimed in claim 1 wherein said control circuit means is a microcontroller.

3. A fuel cell stand-by energy supply system as claimed in claim 2 wherein said device is an electrically operated fossil fuel forced air furnace or hot water heater, said device having a heat producing element and an electrically operated multi-speed blower motor, burner and controls.

4. A fuel cell stand-by energy supply system as claimed in claim 3 wherein said heat producing element is supplied electric power through a first switch means, said electrically operated multi-speed blower having a speed control switch through which the speed of said motor is controlled.

5. A fuel cell stand-by energy supply system as claimed in claim 4 wherein said furnace is provided with a temperature sensing probe connected to said microcontroller and providing a signal representative of temperature, said microcontroller operating said speed control switch to control the energy consumption of said blower motor relative to the remaining energy capacity of said fuel cell d.c. supply feeding said voltage conditioning circuit.

6. A fuel cell stand-by energy supply system as claimed in claim 5 wherein said speed control switch is a multi position switch to operate said blower at one of available selected speeds to control the energy consumption from said operating a.c. supply of said voltage conditioning circuit fed by said fuel cell.

7. A fuel cell stand-by energy supply system as claimed in claim 5 wherein said furnace control switch means is automatically operated by a thermostat which monitors ambient temperature in a building enclosure whereby to connect power from said fuel cell d.c. supply to said heat producing element when the temperature in said building enclosure falls below a preset value of said thermostat.

8. A fuel cell stand-by energy supply system as claimed in claim 7 wherein said heat producing element is a fossil fuel burner.

9. A fuel cell stand-by energy supply system as claimed in claim 2 wherein there is further provided a charger connected to said power supplied by said electrical utility, said charger charging a battery supply for operating said microcontroller and its associated circuitry and switching devices.

10. A fuel cell stand-by energy supply system as claimed in claim 2 wherein there is further provided an auxiliary electrical outlet connector connected to said operating a.c. supply of said voltage conditioning circuit to supply power to other electrically operated devices, and a switch operated by said microcontroller to switch said outlet connector ON and OFF as determined by the available power of said fuel cell d.c. supply feeding said voltage conditioning circuit.

11. A fuel cell stand-by energy supply system as claimed in claim 2 wherein said detection means is a detector circuit associated with said microcontroller, said detector circuit incorporating a time delay circuit and a switching circuit for actuating a main switch after said time delay to connect said device to said voltage conditioning circuit fed by said fuel cell and for operating said fuel cell switch to actuate said voltage conditioning circuit by connecting said fuel cell d.c. supply thereto.

12. A fuel cell stand-by energy supply system as claimed in claim 11 wherein said voltage conditioning circuit is comprised of a current stabilizing circuit connected across said fuel cell d.c. supply and feeding an inverter circuit which converts the d.c. supply of said fuel cell to a 120 volt a.c. supply, and a phase control circuit at an output of said inverter.

13. A fuel cell stand-by energy supply system as claimed in claim 11 wherein said fuel cell d.c. supply is comprised of one or more fuel cells each having an integrated control, said fuel cells being fed by an hydrogen or direct hydrocarbon supply container through suitable valve means.

14. A fuel cell stand-by energy supply system as claimed in claim 2 wherein there is further provided a current and voltage sensor at an outlet of said fuel cell d.c. supply for feeding information signals to said microcontroller, said microcontroller having integration circuit means to calculate the actual power output of said fuel cell d.c. supply at any given moment.

15. A fuel cell stand-by energy supply system as claimed in claim 14 wherein an energy indicating device is fed by said microcontroller to indicate said actual watt-hour of said fuel cell d.c. supply whereby to determine the used and available watt-hour of said supply.

16. A fuel cell stand-by energy supply system as claimed in claim 2 wherein said microcontroller is provided with an autodiagnostic circuit function.

* * * * *